United States Patent [19]

Takeshima et al.

[11] Patent Number: 5,583,847
[45] Date of Patent: Dec. 10, 1996

[54] OPTICAL DISK HAVING PREDETERMINED CROSS-TRACK SIGNAL, CROSS-TRACK MINIMUM SIGNAL, AND PUSH-PULL SIGNAL

[75] Inventors: Hideharu Takeshima; Masae Kubo, both of Kanagawa, Japan

[73] Assignee: Mitsubishi Chemical Corporation, Tokyo, Japan

[21] Appl. No.: 408,385

[22] Filed: Mar. 22, 1995

[30]   Foreign Application Priority Data

Mar. 22, 1994  [JP]  Japan ................................. 6-075345

[51] Int. Cl.⁶ ........................................................ G11B 7/09
[52] U.S. Cl. ................................. 369/275.4; 369/275.3; 369/275.2
[58] Field of Search ........................... 369/275.1, 275.2, 369/275.3, 275.4; 430/320, 321; 428/64.2, 64.3, 64.4

[56]   References Cited

U.S. PATENT DOCUMENTS 4,750,162  6/1988  Tajima ........................... 369/46
5,353,277  10/1994  Yasuda et al. .................. 369/275.4

FOREIGN PATENT DOCUMENTS 0527602  2/1993  European Pat. Off. .

*Primary Examiner*—David C. Nelms
*Assistant Examiner*—Andrew Q. Tran
*Attorney, Agent, or Firm*—Oblon, Spivak, McClelland, Maier & Neustadt, P.C.

[57]   ABSTRACT

A high density optical disk having data tracks and pre-grooves disposed in a track pitch not higher than 1.2 μm provides groove signals to a disk drive having a two-divided optical detector for tracking control. The groove signal characteristics of the optical disk is such that an envelope cross-track signal, an envelope cross-track minimum signal and an envelope push-pull signal are not less than 0.10, not less than 0.12 and between 0.10 and 0.70, respectively, when normalized by a virtual mirror surface. The optical disk may be any of a magneto-optical (MO) disk, a ROM disk and a partial ROM disk and can provide any type of disk drives with sufficient groove signals for tracking control in both a magneto-optical area and a ROM area.

10 Claims, 10 Drawing Sheets

← ROM AREA 14 → ← 12 MAGNETO-OPTICAL RECORDING AREA →

ROM AREA
$I_1$, $I_2$

MAGNETO-
OPTICAL
RECORDING
AREA
$I_1$, $I_2$

OPTICAL DISK HAVING PREDETERMINED CROSS-TRACK SIGNAL, CROSS-TRACK MINIMUM SIGNAL, AND PUSH-PULL SIGNAL

BACKGROUND OF THE INVENTION (a) Field of the Invention

The present invention relates to an optical disk and, more particularly, to an optical disk in which optical pre-grooves are formed for tracking control.

(b) Description of the Related Art

Recently, optical disks including a read-only optical disk, rewritable magneto-optical disk and the like have widely been used as high density recording media. Magneto-optical disks, for example, include one having a rewritable magneto-optical recording area wherein a customer stores his own data by himself and a ROM area wherein a disk manufacturer stores read-only data based on the length of a pit. In the above type of a magneto-optical disk, spiral pre-grooves (or annular pre-grooves) are generally formed for tracking control whereby tracking of a head is controlled based on a location of the pre-grooves.

FIGS. 1A and 1B are a plan view and a cross-sectional view taken along line A—A of FIG. 1A, respectively, for showing a generalized structure of an optical disk of the type as described above. The magneto-optical disk has a magneto-optical recording area 12 and a ROM area 14 on a recording surface 10 thereof. The magneto-optical recording area 12 includes magneto-optical data-tracks 16 each formed of a planar land area into which data are to be stored and optical pre-grooves 18 disposed alternately with the magneto-optical data-tracks 16 to guide an optical spot for recording/reproducing use to the centers of the magneto-optical data-tracks 16. On the other hand, the ROM area 14 includes optical data-tracks 20 wherein read-only data to be read by the optical spot are stored and optical pre-grooves 18 to guide the optical spot to the centers of the optical data-tracks 20.

Each of the optical data-tracks 20 has a structure wherein planar land portions 22 and data-pits 24 are disposed alternately with each other, whereby track numbers, sector numbers or other ROM data are recorded based on the length of the data-pits 24. In general, profiles of the land portions 16 and 22, the optical pre-grooves 18 and the data-pits 24 are formed by transcription of a stamper onto the substrate surface by employing an injection molding technology. This enabling of the transcription makes it possible to produce a great number of replicas in a low cost, which fact renders the optical disks such as a ROM disk or a partial ROM disk most valuable in delivery of identical data such as softwares in a low cost and in a vast volume. Such an ability in which data are reproduced in a vast volume and in a low cost is a most specific characteristic of the optical disks.

Detection of the optical pre-grooves 18 is performed by an optical detector 26 for a servo use divided into two sections in a radial direction of the optical disk to receive a reflected light of an optical spot travelling with a recording/reproducing head in unison. The output $I_1$ of the first photo-sensor section 28 and the output $I_2$ of the second photo-sensor section 30 of the optical detector 26 are arithmetically processed in an unshown signal processing circuit.

FIGS. 2A and 2B illustrate signal waveforms of outputs $I_1$ and $I_2$ from the ROM area and the magneto-optical area, respectively. The outputs $I_1$ and $I_2$ are high when the head is located at a center of the land portion while the outputs $I_1$ and $I_2$ are low when the head is located at a pre-groove portion. Moreover, when the head is staying in the ROM area, the outputs $I_1$ and $I_2$ include high frequency signal components as shown in FIG. 2A due to the data-pits 24 passing the light spot. In the ROM area, low-pass filters are used for eliminating the high frequency components in outputs $I_1$ and $I_2$ output from both photo-sensor sections 28 and 30 to thereby obtain an output similar to the outputs from the magneto-optical area 12 as shown in FIG. 2B.

A summed signal $(I_1+I_2)_{LP}$ given by summation of both outputs $I_1$ and $I_2$ after passing through the low-pass filter is applied, for instance, to counting a number of the pre-grooves that the light spot has crossed over. Similarly, a difference signal $(I_1-I_2)_{LP}$ given by subtraction of the output $I_2$ from the output $I_1$ after passing through the low-pass filter, is applied to detecting a track center by identification of a zero output thereof.

ISO has specified characteristics of groove signals including a cross-track signal, a cross-track minimum signal and a push-pull signal, which are obtained from optical disks and generally applied to the tracking control, in common standards for optical disk systems so that interchangeability is ensured among different drive units used for driving various optical disks such as a magneto-optical disk, a ROM disk and a partial ROM disk.

The cross-track signal is referred to as a signal proportional to a difference output given by subtraction of a first summed signal $(I_1+I_2)_{LPOG}$, which generates from the head located in a pre-groove portion 18, from a second summed signal $(I_1+I_2)_{LPOL}$, which generates from the head located in land portions 16 and 22, the cross-track signal being normalized by a reflected light $(I_1+I_2)_a$ from a substantially planar mirror surface (referred to as "normalized by the reflectance of a mirror surface" hereinafter). The cross-track minimum signal is referred to as a signal proportional to the summed signal $(I_1+I_2)_{LPOG}$ described above which generates from the head located in the pre-groove portion while the push-pull signal is referred to as a signal proportional to a difference between the outputs of both the photo-sensor sections after passing through the low-pass filters, each of the signals being normalized by the reflectance of a mirror surface.

Recently, a high densification of an optical disk has been pursued by reducing not only a pre-groove spacing (namely, a track-pitch) but also a pit spacing in a data-track to increase a recording capacity of the optical disk. A conventional method for specifying an optical disk according to ISO standards, however, cannot afford to ensure sufficient signal precision required for tracking control under the request for the high densification, especially from pre-grooves of a ROM area. To solve the problem, it has been proposed that a peak-hold circuit is to be used in a drive unit during reproduction of a pre-groove signal from the ROM area. The method will be described with reference to FIGS. 3A through 3C.

The proposed method includes passing both the outputs $I_1$ and $I_2$ shown in FIGS. 2A and 2B through respective peak-hold circuits to extract their upper envelopes $I_{1PH}$ and $I_{2PH}$ as shown in FIG. 8A. Thereafter, a summed signal $(I_1+I_2)_{PH}$ is given by summation of both upper envelopes as shown in FIG. 8B while a difference signal $(I_1-I_2)_{PH}$ is given by subtraction of upper envelope $I_{2PH}$ from upper envelope $I_{1PH}$ as shown in FIG. 3C. Those proposed signals $(I_1+I_2)_{PH}$ and $(I_1-I_2)_{PH}$ can be utilized for head tracking similarly to the conventional summed signal $(I_1+I_2)_{LH}$ and difference signal $(I_1-I_2)_{LH}$.

The proposed summed signal $(I_1+I_2)_{PH}$ has an amplitude larger than the amplitude of the conventional summed signal $(I_1+I_2)_{LP}$, so that an error rate can be suppressed in counting a number of tracks that the head has crossed over by identification of a maximum or minimum value thereof. The proposed difference signal $(I_1-I_2)_{PH}$ given by the method has both an excellent linearity and a steep slope at a zero signal as compared with those of the conventional difference signal $(I_1-I_2)_{LP}$, so that an advantage of a higher precision is obtained in tracking of a head toward a track center.

However, a structure of a high density optical disk having a track-pitch less than about 1.2 μm and suitable for the driving units which employ the proposed method described above has not been known.

SUMMARY OF THE INVENTION

In view of the foregoing, it is an object of the present invention to provide a high density optical disk having a track-pitch not more than 1.2 μm, especially suitable for a drive unit which includes a peak hold circuit for enabling a high speed and high precision tracking of a recording/reproducing head.

In accordance with the present invention, there is provided an optical disk comprising data tracks and pre-grooves disposed correpsondingly to the data tacks, the data tracks each having at least a planar land portion and disposed in a track-pitch not more than 1.2 μm, the data tracks and pre-grooves providing a reflected signal light to an optical detector of a disk drive, the reflected signal light containing information of groove signals including at least an envelope cross-track signal which is derived from $(I_1+I_2)_{PH}$ not less than 0.10, an envelope cross-track minimum signal which is derived from $(I_1+I_2)_{PH}$ not less than 0.12 and an envelope push-pull signal which is derived from $(I_1-I_2)_{PH}$ between 0.10 and 0.70 when normalized by a reflectance of a substantially mirror surface.

An optical disk according to the present invention can also employ groove signals normalized by a light intensity received by an optical detector located at the center of a land portion (referred to as "normalized by the reflectance of a center of the land portion" hereinafter) instead of the groove signals described above. On that occasion, signal characteristics of the envelope cross-track signal and the envelope cross-track minimum signal are not lower than 0.15 and 0.20, respectively, while a signal characteristic of the envelope push-pull signal is not lower than 0.15 and has a variance within 0.65.

Signal processing circuits of the proposed disk drive having a peak-hold circuit provide a cross-track signal, a cross-track minimum signal and a push-pull signal in general by processing a summed signal $(I_1+I_2)_{PH}$ and a difference signal $(I_1-I_2)_{PH}$ given by summation and subtraction, respectively, of respective envelopes of outputs which have been prepared by peak-hold processing of original outputs $I_1$ and $I_2$ from photo-sensor sections 28 and 30.

A signal used in general for recording data on an optical disk has an extremely high frequency range, for instance, from 1 to 14 MHz or more while a signal used for peak-hold processing has a considerably low frequency, for instance, about 7 kHz when the optical disk is rotating at a rate of 3000 rpm. In view of foregoing, an envelope summed signal $(I_1+I_2)_{ENV}$ and an envelope difference signal $(I_1-I_2)_{ENV}$ given by peak-hold processing of a summed signal $(I_1+I_2)$ and a difference signal $(I_1-I_2)$ which have been generated, respectively, by plain addition and subtraction of original outputs $I_1$ and $I_2$ provide signals substantially same as the proposed summed signal $(I_1+I_2)_{PH}$ and difference signal $(I_1-I_2)_{PH}$, respectively. Namely, the proposed summed signal $(I_1+I_2)_{PH}$ and difference signal $(I_1-I_2)_{PH}$ obtained by the individual peak-hold processing of the original outputs $I_1$ and $I_2$ are equivalent to the envelope summed signal $(I_1+I_2)_{ENV}$ and the envelope difference signal $(I_1-I_2)_{ENV}$, respectively, which are obtained by the final peak-hold processing of summed signal and difference signal. Accordingly, the terms "envelope cross-track signal", "envelope cross-track minimum signal" and "envelope push-pull signal" as used for representing groove signal characteristics in the present invention are not limited to the groove signals generated in the proposed disk drive but rather expandable to a generalized signal concept substantially equivalent to those signals.

Furthermore, those groove signals are not limited to signals processed after conversion of both outputs from a two-divided optical detector into electric signals but rather expandable to signals processed after conversion of outputs from another type of optical detector equivalent to the two-divided optical detector into electric signals, to signals processed as optical signals as they are or to signals processed after conversion into other species of signals.

An optical disk according to the present invention enables a high precision tracking of a head as well as a high speed transfer and a high speed tracking of a head through employing the configuration as described above.

BRIEF DESCRIPTION OF THE DRAWINGS

The above and other objects, features and advantages of the present invention will be more apparent from the following description, taking in conjunction with accompanying drawings in which.

DESCRIPTION OF THE PREFERRED EMBODIMENTS

Before describing preferred embodiments according to the present invention, principles of the present invention will be detailed for a better understanding of the present invention.

Figure 4A:
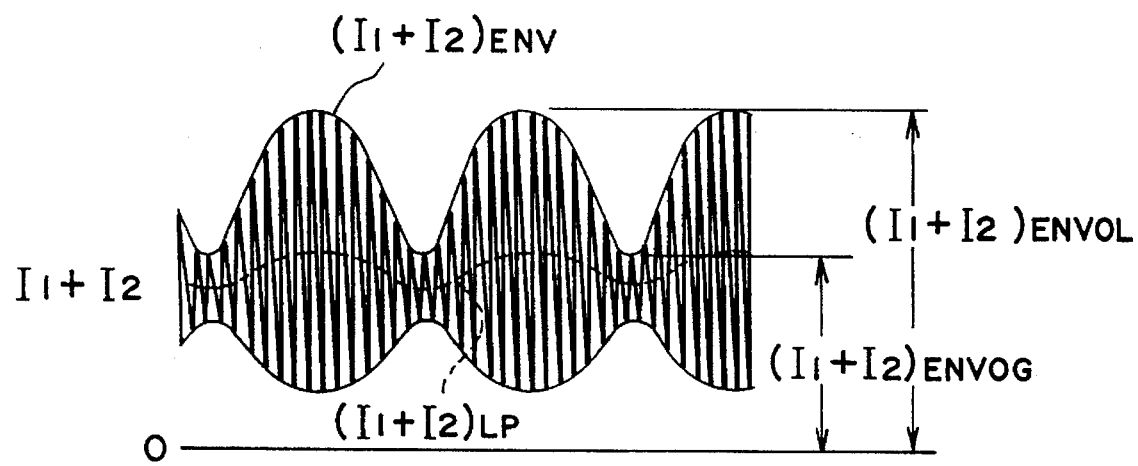
FIGS. 4A and 4B are waveform diagrams showing respective envelopes of a summed signal and a difference signal of outputs $I_1$ and $I_2$ of FIGS. 2A and 2B.
Figure 4B:
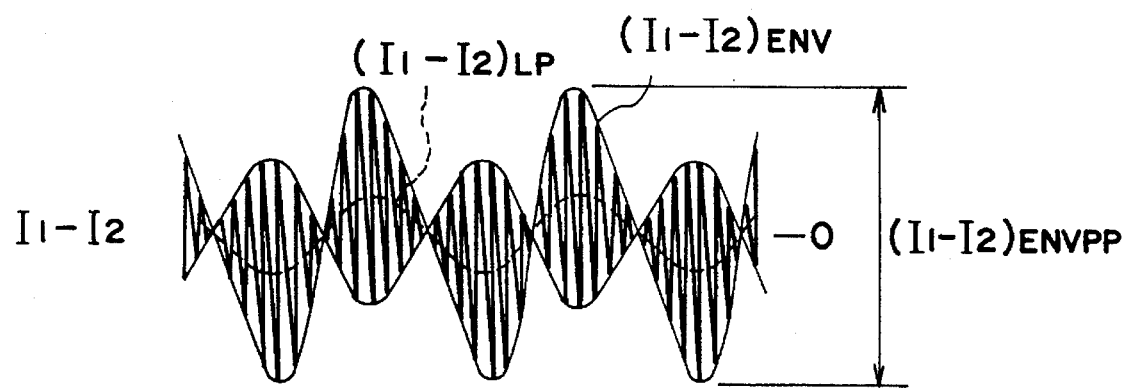

As described before, the proposed summed signal $(I_1+I_2)_{PH}$ and the difference signal $(I_1-I_2)_{PH}$ given by using the aforesaid peak-hold circuits correspond to the envelopes of a summed signal $(I_1+I_2)$ and a difference signal $(I_1-I_2)$ given by summation and subtraction, respectively, of the original outputs $I_1$ and $I_2$ as they are. Generally, an optical disk provides specific pre-groove signals to drive units which are operating data processings in a method of a common standard. Those envelope summed signal $(I_1+I_2)_{ENV}$ and envelope difference signal $(I_1-I_2)_{ENV}$ have larger amplitudes than those of the conventional summed signal $(I_1+I_2)_{LP}$ and difference signal $(I_1-I_2)_{LP}$, respectively, as shown in FIGS. 4. Consequently, it is convenient to specify a structure of an optical disk, from which pre-groove signals are to be reproduced in a drive unit including the peak-hold circuits proposed before, by employing characteristics to the envelope summed and difference signals.

The envelope summed signal $(I_1+I_2)_{ENV}$, on which a cross-track signal and a cross-track minimum signal are based for specifying an optical disk structure according to the present invention, depends on an optical reflectivity of a recording surface of the optical disk. Selections of a ratio of a land portion width to a pre-groove width, a pre-groove depth and a surface reflectance can provide controlling of a cross-track signal characteristic of an optical disk. For instance, the envelope cross-track signal characteristic increases in amplitude with increasing depth of pre-grooves as conventional cross-track signal characteristic. The envelope cross-track minimum signal characteristic decreases in amplitude with an increasing depth of pre-grooves as conventional cross-track minimum characteristic. Those signal amplitudes differ between in a magneto-optical area and in a ROM area. The envelope difference signal (or envelope push-pull signal) $(I_1-I_2)_{ENV}$ is referred to as a signal representing an envelope of a difference between outputs $I_1$ and $I_2$ of a two-divided optical detector, the amplitude $(I_1-I_2)_{ENVPP}$ thereof depending on an intensity of a light diffracted by the pre-groove portions. In general, the envelope push-pull signal assumes a maximum at a specified value of a groove depth and increases in amplitude with an increasing ratio of groove width to land width in the pre-grooves as the conventional push-pull signal. The amplitude $(I_1-I_2)_{ENVPP}$ differs between in a magneto-optical recording area and in a ROM area.

The groove signals generated in a conventional or proposed drive unit generally include a cross-track signal, a cross-track minimum signal and a push-pull signal. The cross-track signal denotes in general an amplitude of a summed signal (cross-groove signal $(I_1+I_2)$) generated during transfer of an optical spot for recording/reproducing use between tracks in unison with a head or a pick-up of a drive unit. The cross-track signal is mainly used for counting a number of pre-grooves that the light spot has crossed over. Accordingly, if the cross-track signal is small in magnitude, an erroneous counting of a pre-groove number that the light spot has crossed over will arise.

On the other hand, the cross-track minimum signal denotes a minimum level of the cross-groove signal $(I_1+I_2)$ generated during transfer of the optical spot for recording/reproducing use whereas the push-pull signal $(I_1-I_2)$ denotes a deviation of the optical spot for recording/reproducing use from a center of two adjacent pre-grooves (namely, from a track center). Accordingly, it is important to guarantee that the push-pull signal has a linearity and a sufficient slope as a function of the deviation of the optical spot for recording/reproducing use from the track center in a vicinity of the track center.

Now, the envelope cross-track signal characteristic of the optical disk according to the present invention is referred to as a magnitude of a signal proportional to an envelope difference output which is given by a subtraction of a first envelope summed signal $(I_1+I_2)_{ENVOG}$ obtained at a pre-groove center of the optical disk from a second envelope summed signal $(I_1+I_2)_{ENVOL}$ obtained at a land center, the signal characteristic being normalized, for instance, by the reflectance of a mirror surface. Namely, the characteristic is defined as a value obtained by dividing the envelope difference output by an amount of a reflected light $(I_1+I_2)_a$ from a virtual mirror surface.

Furthermore, the envelope cross-track minimum signal characteristic of the optical disk according to the present invention is referred to as a signal proportional to the first envelope summed signal $(I_1+I_2)_{ENVOG}$ obtained at a pre-groove center of the optical disk whereas the push-pull signal characteristic is referred to as a signal proportional to an amplitude $(I_1-I_2)_{ENVPP}$ of an envelope difference signal $(I_1-I_2)_{ENV}$, both of which are defined on the basis of the reflectance of a mirror surface.

Alternatively, each of the signals described above can be expressed on the basis of the reflectance of a land center in a magneto-optical recording area having no pit therein. On that occasion, each of the envelope difference output, the envelope summed signal and the envelope push-pull signal at a pre-groove portion is defined as quotients obtained by dividing originally obtained signals by an amount of reflected light $(I_1+I_2)_{OL}$ obtained by the optical detector located at the center of the land portion.

In general, an optical spot for recording/reproducing use of a drive unit is controlled for tracking based on a quotient signal of an output difference $(I_1-I_2)$ divided by an output sum $(I_1+I_2)$ so that the head may always stay at the center of a track. Consequently, a divider circuit performing a division is difficult in designing if the envelope cross-track minimum signal is small in magnitude. The envelope push-pull signal is also preferred to have a significant amount of amplitude in order to guarantee both an SN ratio (S/N) and a signal linearity as a function of a deviation of an optical spot for recording/reproducing use from a track center.

On the other hand, some of drive units employ a push-pull signal instead of a cross-track signal for counting a number of pre-grooves that the light spot has crossed during transfer of the recording/reproducing head. Accordingly, it is preferable that the envelope push-pull signal has a signal amplitude of a certain value in order to guarantee an interchangeability between drive units.

Moreover, it is preferred that the characteristics of respective envelope groove signals described above do not differ in a large amount between in a magneto-optical recording area and in a ROM area, taking into a consideration that a common drive unit is used for recording/reproducing data not only on a rewritable magneto-optical disk in which substantially all of the surface thereof constitutes a magneto-optical recording area but also on a ROM disk and a partial ROM disk in which substantially an entire surface or a part of the surface thereof constitutes a ROM area.

Respective groove signal characteristics in a magneto-optical area to define an optical disk according to the present invention, namely the envelope cross-track signal characteristic, the envelope cross-track minimum signal characteristic and the envelope push-pull signal characteristic, are represented by following equations when the amount of the reflected light $(I_1+I_2)_a$ from a mirror surface is employed as a reference:

$$CT=((I_1+I_2)_{OL}-(I_1+I_2)_{OG})/(I_1+I_2)_a$$

$$CTM=(I_1+I_2)_{OG}/(I_1+I_2)_a$$

$$PP=(I_1-I_2)_{PP}/(I_1+I_2)_a \quad (1)$$

Alternatively, respective groove signal characteristics in the magneto-optical area are represented by the following equations when the amount of reflected light $(I_1+I_2)_{OL}$ obtained by a head located at a center of a land portion is employed as a reference:

$$CT=((I_1+I_2)_{OL}-(I_1+I_2)_{OG})/(I_1+I_2)_{OL}$$

$$CTM=(I_1+I_2)_{OG}/(I_1+I_2)_{OL}$$

$$PP=(I_1-I_2)_{PP}/(I_1+I_2)_{OL} \quad (2)$$

On the other hand, respective groove signal characteristics in a ROM area described above are defined by the following equations when the amount of reflected light $(I_1+I_2)_a$ from a mirror surface is employed as a reference:

$$CT=((I_1+I_2)_{ENVOL}-(I_1+I_2)_{ENVOG})/(I_1+I_2)_a$$

$$CTM=(I_1+I_2)_{ENVOG}/(I_1+I_2)_a$$

$$PP=(I_1-I_2)_{ENVPP}/(I_1+I_2)_a \quad (3)$$

Similarly, respective groove signal characteristics in the ROM area are defined by the following equations when the amount of reflected light $(I_1+I_2)_{OL}$ from a center of a land portion in a magneto-optical recording area is employed as a reference:

$$CT=((I_1+I_2)_{ENVOL}-(I_1+I_2)_{ENVOG})/(I_1+I_2)_{OL}$$

$$CTM=(I_1+I_2)_{ENVOG}/(I_1+I_2)_{OL}$$

$$PP=(I_1-I_2)_{ENVPP}/(I_1+I_2)_{OL} \quad (4)$$

When the respective signal characteristics are defined by the definitions as described above, a small pre-groove spacing (a track-pitch) and a small pit spacing in a track due to an increase in recording capacity of an optical disk cause problems in the groove signals generated from the optical disk, as described below. The problems will be detailed with reference to FIGS. 5–7. The problems turn out notable especially when the diameter of a beam spot is scaled down from a conventional value 1.37 μm to less than about 1.20 μm.

Figure 1A:
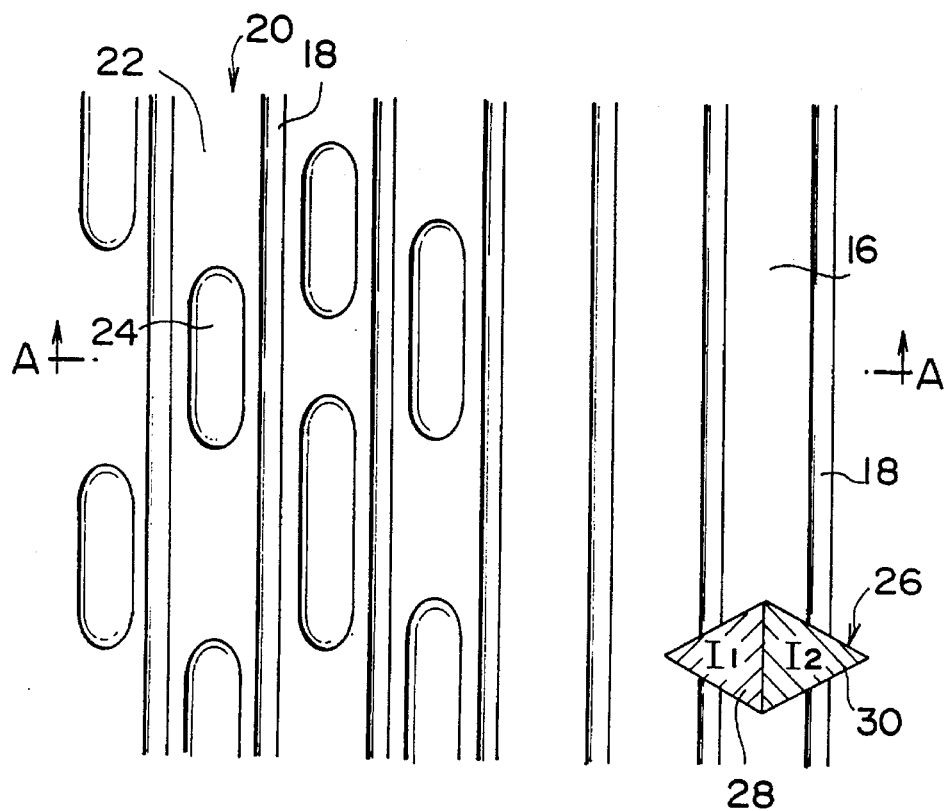
FIGS. 1A and 1B are a plan view and a cross-sectional view, respectively, showing a general schematic structure of an optical disk.
Figure 1B:
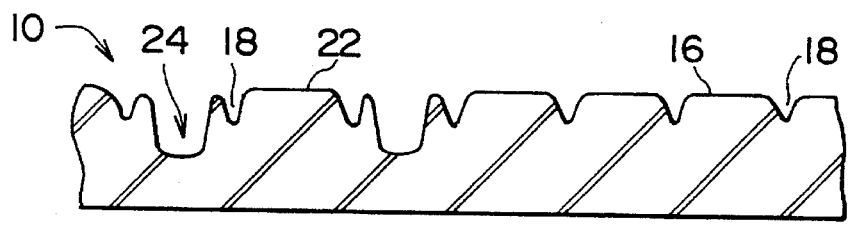
Figure 2A:
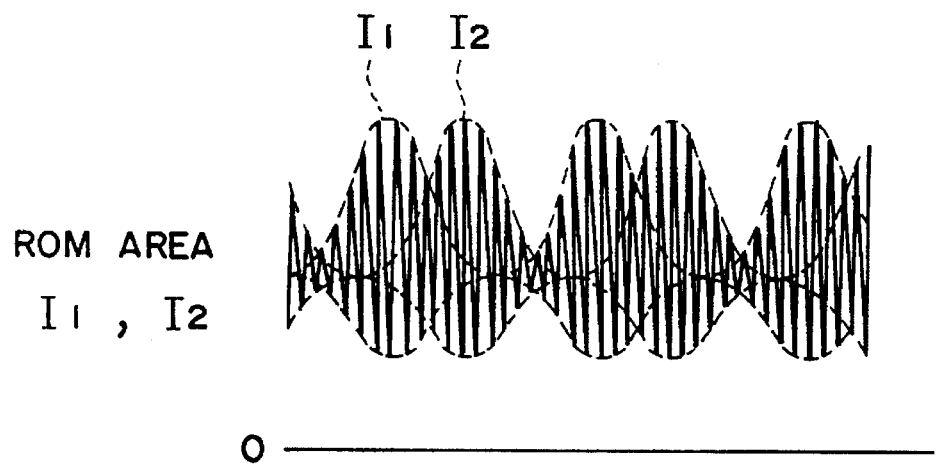
FIGS. 2A and 2B are general waveform diagrams of outputs $I_1$ and $I_2$ from photo-sensor sections located in a ROM area and in a magneto-optical area, respectively, of the optical disk of FIGS. 1A and 1B.
Figure 2B:
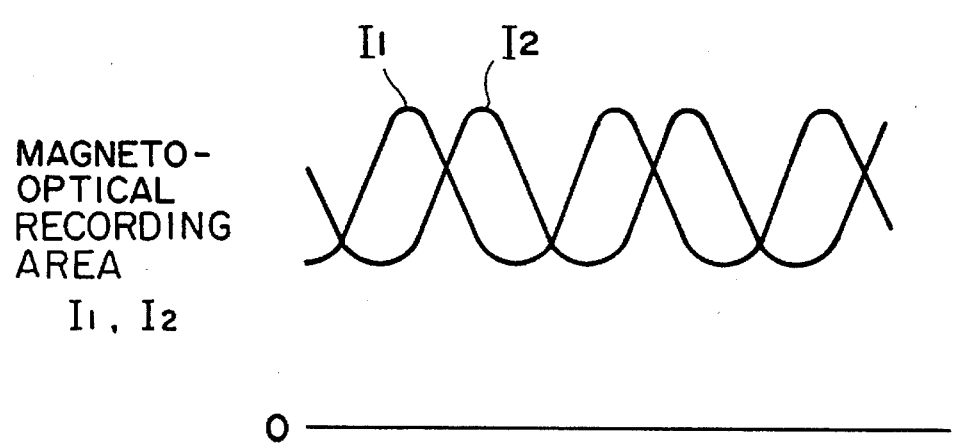
Figure 3A:
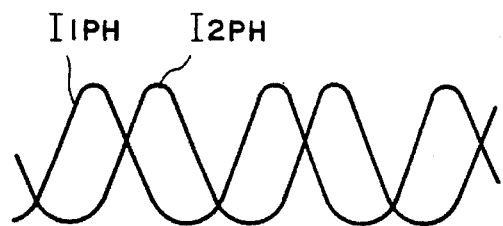
FIGS. 3A, 3B and 3C are waveform diagrams of signals obtained by proposed peak-hold processings of outputs $I_1$ and $I_2$ of FIGS. 2A and 2B.
Figure 3B:
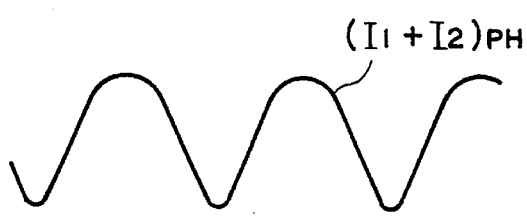
Figure 3C:
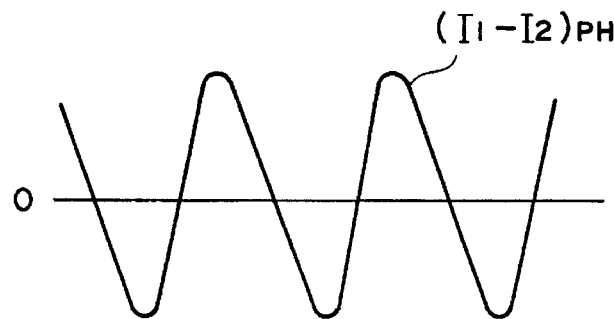
Figure 5:
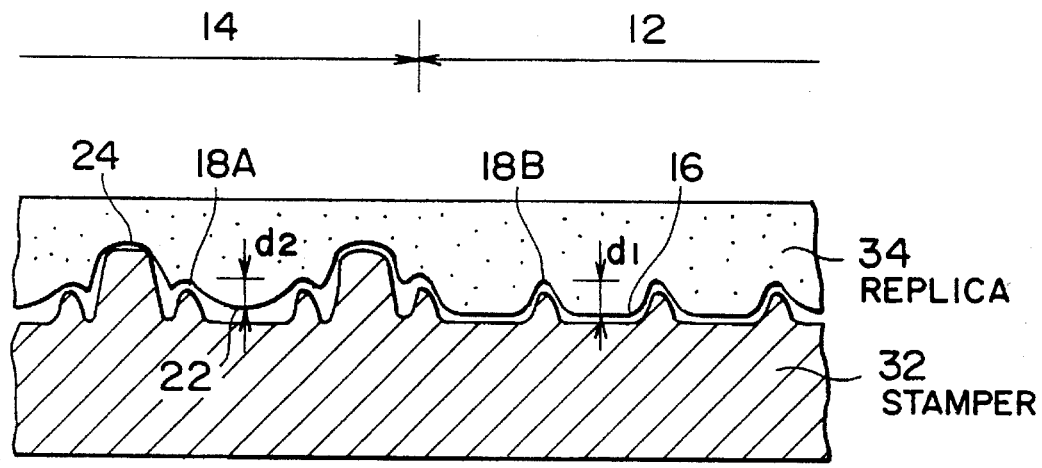
FIG. 5 is a general cross-sectional view of a stamper and a replica for showing problems arising during manufacturing an optical disk.
Figure 6:
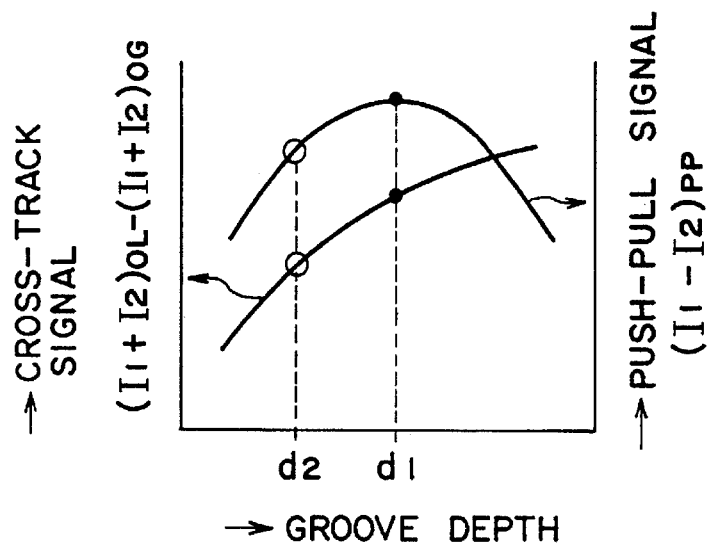
FIG. 6 is a graph showing a groove depth dependence of a groove signal in the optical disk of FIGS. 1A and 1B.
Figure 7:
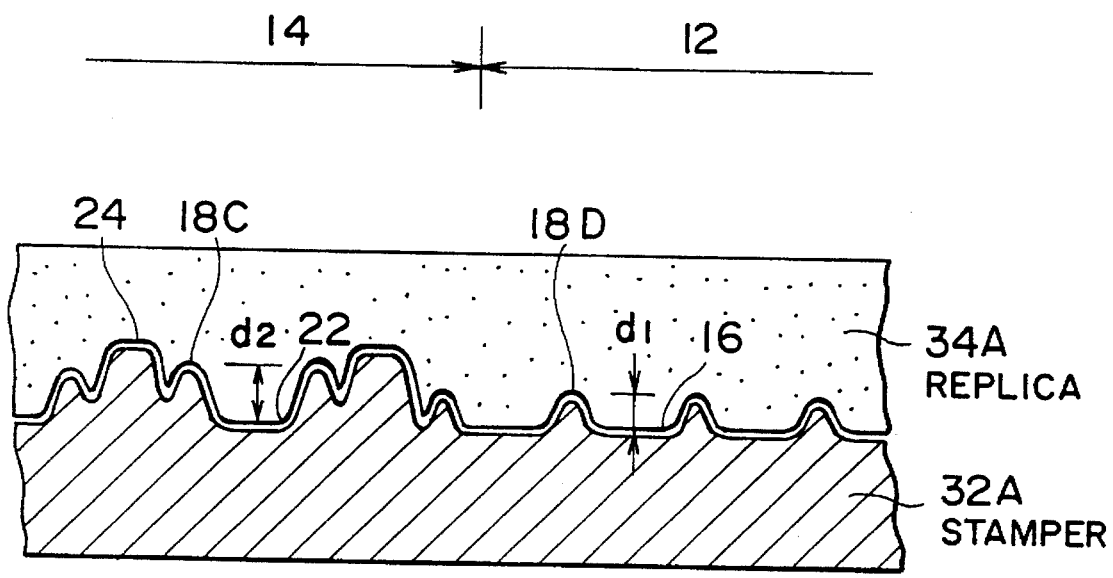
FIG. 7 is a cross-sectional view of a stamper and a replica for showing another problem arising during, manufacturing an optical disk.

FIGS. 5 and 7 are generalized cross-sectional views showing a stamper and a replica taken along line A—A of FIG. 1A for explaining phenomena involved in manufacturing a replica of an optical disk. FIG. 6 is a graph showing pre-groove depth dependences of a general cross-track signal $((I_1+I_2)_{OL}-(I_1+I_2)_{OG})$ and a general push-pull signal amplitude $(I_1-I_2)_{PP}$, respectively.

If a pre-groove spacing and a pit spacing are reduced in size, it is forecasted that a resin will not adhere well to a convex and concave surface of a stamper 32 as shown in FIG. 5 during forming a replica 34, which is composed of either a plastic resin substrate or a glass substrate and a photo-curing plastic resin, by using a stamper 32, resulting in an unsatisfactory filling of the land portion 22. On that occasion, a groove depth $d_2$ of a pre-groove 18A located in the vicinity of the pit 24 in the ROM area 14 is smaller than a groove depth $d_1$ of a pre-groove 18B located in the magneto-optical recording area 12 having no pit therein.

The groove depth $d_1$ of the magneto-optical recording area 14 is, in general, selected so that the amplitude $(I_1-I_2)_{PP}$ of the push-pull signal substantially assumes a maximum value. Accordingly, both of the cross-track signal $((I_1+I_2)_{OL}-(I_1+I_2)_{OG})$ and the push-pull signal amplitude $(I_1-I_2)_{PP}$ in ROM area 14 having the small groove depth $d_2$ is smaller than those in the magneto-optical recording area 12 having the large groove depth $d_1$. The above situation that the signal intensity of a drive unit differs in a large amount between in the magneto-optical recording area 12 and in the ROM area 14 is not preferred for precise tracking control.

Manufacturing of the stamper 32 is pursued, in general, by an exposure of a glass plate coated by a photo-sensitive plastic resin film to a laser light. During the exposure, the original glass plate is subjected to a simultaneous exposure of two optical beams, one of which is an optical spot for inscribing the pre-grooves while the other is an optical spot for inscribing the pits. Accordingly, during exposure for the pits, the exposure light is leaked into the adjacent exposure portions for pre-groove, which is liable to make the pre-groove 18C located adjacent to the pit 24 deeper and wider in the stamper 32A as shown in FIG. 7. In the replica 34A formed by employing the stamper 32A as manufactured in this manner, the groove depth $d_2$ and width of the pre-groove 18C located adjacent to the pit 24 in the ROM area 14 are formed larger than the groove depth $d_1$ and width of the pre-groove 18D located in the magneto-optical recording area 12. Accordingly, there arises a problem that the intensity of the cross-track signal is larger in some parts of the ROM area 14 than in the magneto-optical recording area 12.

A numerical value of the cross-track minimum signal characteristic is equivalent to a minimum value of the denominator $(I_1+I_2)$ of a divider circuit for obtaining expression $(I_1-I_2)/(I_1+I_2)$ used for the tracking control of the recording/reproducing beam. Consequently, a precision lowering and a bandwidth narrowing of the divider circuit take place if the value described above is small. Namely, there arise an enhanced error in tracking control of the recording/reproducing beam and a performance lowering in the high speed movement and in the high speed tracking of the recording/reproducing beam, which lead to deterioration in recording/reproducing characteristics. Furthermore, in order to obtain a sufficient S/N ratio in the cross-track signal, the minimum value of the cross-track signal should be larger than a certain value on the basis of the amount of reflected light from the mirror surface.

In view of the groove characteristics that drive units require on an optical disk medium, the structure of the optical disk is defined according to the present invention by specifying numerical values in respective envelope groove signal characteristics of the optical disk. When envelope groove signals are to be reproduced from a high density optical disk of the present invention having a track spacing less than about 1.2 μm by both a drive unit in which a polarization direction of an optical beam for recording/reproducing use is parallel to the pre-grooves and another drive unit in which a polarization direction is perpendicular to the pre-grooves, the groove signal characteristics in a ROM area of the optical disk should satisfy numerical values tabulated either on Table 1 or on Table 2 shown below depending on the polarization direction, namely, parallel or perpendicular one.

Tables 1 and 2 show the signal characteristics that an optical disk according to the present invention should satisfy when the envelope groove signals are expressed in normalization by the reflectance of a mirror surface, namely by $(I_1+I_2)_a$, and when the envelope groove signal is expressed in normalization by the reflectance of a land portion, namely by $(I_1+I_2)_{OL}$, respectively. The envelope cross-track signal, the envelope cross-track minimum signal and the envelope push-pull signal are abbreviated as "CT signal", "CTM signal" and "P—P signal", respectively, on the following tables and other tables shown hereinafter.

TABLE 1

| | Normalized by $(I_1 + I_2)_a$ | | |
|---|---|---|---|
| Species of Groove Signal | Parallel Polarization | Perpendicular Polarization | Range of Numerical Value |
| CT Signal | ≧0.10 | ≧0.10 | ≧0.10 |
| CTM Signal | ≧0.15 | ≧0.12 | ≧0.12 |
| P-P Signal | 0.15 ~ 0.75 | 0.10 ~ 0.55 | ≧0.10 Variance ≦ 0.60 |

TABLE 2

| | Normalized by $(I_1 + I_2)_{OL}$ | | |
|---|---|---|---|
| Species of Groove Signal | Parallel Polarization | Perpendicular Polarization | Range of Numerical Value |
| CT Signal | ≧0.15 | ≧0.15 | ≧0.15 |
| CTM Signal | ≧0.25 | ≧0.21 | ≧0.20 |
| P-P Signal | 0.25 ~ 0.90 | 0.15 ~ 0.80 | ≧0.15 Variance ≦ 0.65 |

As shown on Table 1, signal characteristics of the optical disk nomalized by $(I_1+I_2)_a$ should satisfy the numeric ranges so that the envelope cross-track signal is not lower than 0.10, the envelope cross-track minimum signal is not lower than 0.12, the envelope push-pull signal is not lower than 0.10 and has a variance not higher than 0.60, both in parallel and in perpendicular polarization directions.

Signal characteristics of the optical disk normalized by $(I_1+I_2)_{OL}$ should satisfy the numerical ranges so that the envelope cross-track signal is not lower than 0.15, the envelope cross-track minimum signal is not lower than 0.20, the envelope push-pull signal is not lower than 0.15 and has a variance not higher than 0.65 both in parallel and perpendicular polarization directions.

If the numerical value of cross-track minimum signal characteristics is lower than that shown on the above tables, precision lowering and bandwidth narrowing will arise in the divider circuit, resulting in an enhanced error in tracking control and in reduced performance during high speed transfer/tracking of the recording/reproducing beam.

Further preferable values for groove signal characteristics of the optical disk according to the present invention are shown on Tables 3 and 4 similarly to Tables 1 and 2, respectively.

TABLE 3

| | Normalized by $(I_1 + I_2)_a$ |
|---|---|
| Species of Groove Signal | Range of Preferred Numerical Value |
| CT Signal | ≧0.20 |
| CTM Signal | ≧0.15 |
| P-P Signal | ≧0.15 Variance ≦ 0.45 |

TABLE 4

| | Normalized by $(I_1 + I_2)_{OL}$ |
|---|---|
| Species of Groove Signal | Range of Preferred Numerical Value |
| CT Signal | ≧0.30 |
| CTM Signal | ≧0.25 |
| P-P Signal | ≧0.25 Variance ≦ 0.5 |

As shown on Table 3, when normalized by $(I_1+I_2)_a$, it is preferred that the groove signal characteristics satisfy that the envelope cross-track signal is not lower than 0.20, the envelope cross-track minimum signal is not lower than 0.15, the envelope push-pull signal is not lower than 0.15 and has a variance not higher than 0.45. On the other hand, when normalized by $(I_1+I_2)_{OL}$, it is preferred that the envelope cross-track signal is not lower than 0.30, the envelope cross-track minimum signal is not lower than 0.25, the envelope push-pull signal is not lower than 0.25 and has a variance not higher than 0.50 as shown on Table 4.

In general, in order to guarantee a precision and a bandwidth in a divider circuit, the denominator have a minimum value not lower than one tenth of a maximum input level $(I_1+I_2)_a$, preferably not lower than 0.12 and more preferably not lower than 0.15 times thereof. Accordingly, the envelope cross-track minimum signal is selected at a value preferably not lower than 0.12 and more preferably not lower than 0.15 of $(I_1+I_2)_a$.

In order to guarantee a sufficient S/N ratio in the envelope cross-track signal, a minimum value of the envelope cross-track signal is preferably not lower than one tenth of the amount of reflected light $(I_1+I_2)_a$ from the mirror surface, which is a maximum input level in cross-track signal generation circuit, namely a circuit for processing $(I_1+I_2)$. That is, envelope cross-track characteristic is preferably not lower than one tenth, and more preferably not lower than 0.20, of $(I_1+I_2)_a$. If the envelope cross-track signal characteristic of an optical disk falls below the specified value as defined above, erroneous counting of pre-groove number that the light spot has crossed over increases, resulting in lowering of performance for the high-speed transfer/tracking.

The envelope push-pull signal has preferably an amplitude not lower than 0.10, and more preferably not lower than 0.15, of $(I_1+I_2)_a$ from the S/N ratio point of view. Furthermore, its variance range should not be higher than six times its minimum value 0.10, namely not higher than 0.60, and more preferably not higher than the triplied minimum value 0.15. That is, it should not be higher than 0.45 in order to guarantee a linearity of a circuit processing the difference signal ($I_1-I_2$) which is important for the tracking control of the optical spot use toward the track center.

Moreover, it is preferred that those groove signals do not differ very much between in the magneto-optical recording area and in the ROM area, taking into consideration that both a rewritable optical disk substantially consisting of a magneto-optical recording area and a ROM disk substantially consisting of a ROM area or a partial ROM disk composed of a ROM area and a magneto-optical recording area are mounted for recording/reproducing by a common drive unit. As a result, it is preferable that the ratio of a groove signal characteristic in the ROM area to that in the magneto-optical area stays within a range between 0.50 and 1.50, and more preferably, within a range between 0.70 and 1.30.

Signal characteristics of an optical disk as mentioned above not only improve precision in tracking control of the recording/reproducing beam of the drive unit toward the track center but also enable a high speed transfer/tracking of the recording/reproducing beam more effectively.

Although the structure of the optical disk having groove signal characteristics described above cannot be specified by simply specifying a land width and/or a groove width, selection of the light intensities reflected from and diffracted by the optical disk through adjusting a pit width, a pit depth and a pit length as well as the ratio of a groove width to a land width or a groove depth itself of the optical disk can readily attain the above-described numerical values.

Now, preferred embodiments of the present invention will be described with reference to the drawings.

Embodiment 1

As a first embodiment according to the present invention, some samples of high density magneto-optical disks were produced wherein a laminate composed of a 75 nm-thick TaO film, a 28 nm-thick TbFeCo magneto-optical recording film, a 22 nm-thick silicon nitride film and a 45 nm-thick aluminium alloy film was formed on a polycarbonate substrate pre-formed with a pre-groove having a 1.15 μm in track-pitch. The laminate was protected by an ultra-violet light-hardening protective film. Using a laser of 680 nm in wavelength and a lens of 0.55 in NA (numerical aperture), the magneto-optical (MO) areas of the optical disk were subjected to a procedure employing evaluation of the envelope summed and difference signals of outputs $I_1$ and $I_2$ shown in FIGS. 4A and 4B. Both of two species of optical beams were used which have a polarization direction either parallel or perpendicular to the groove direction. Those obtained data were normalized by the reflectance either of a mirror surface or of the center of a land portion.

Figure 8A:
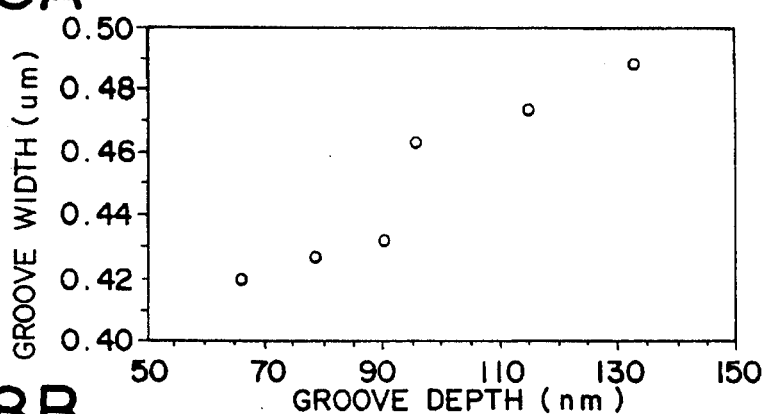
FIG. 8A is a graph showing groove depth dependence of groove width in optical disks according to a first embodiment of the present invention.

Depths of the pre-grooves were selected at six different values including 66, 78, 91, 96, 115 and 133 nm. The different widths of the pre-grooves were obtained including 0.42, 0.43, 0.43, 0.46, 0.47 and 0.49 μm correspondingly to the different groove depths. FIG. 8A shows the groove depth dependence of a groove width in the first embodiment. Profiles of the pre-grooves were measured by approximation employing an optical diffraction.

Figure 8B:
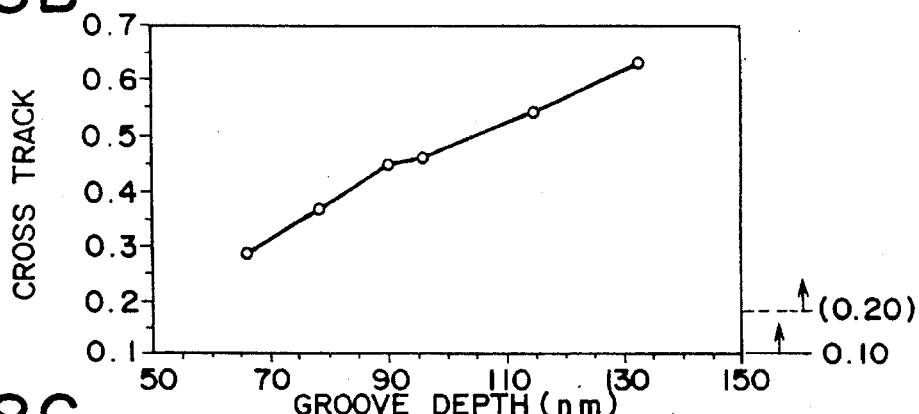
FIGS. 8B, 8C and 8D are graphs showing groove depth dependences of groove signal characteristics obtained from optical disks according to the first embodiment, measured through a parallel polarized optical beam and normalized by the reflectance of a mirror surface.
Figure 8C:
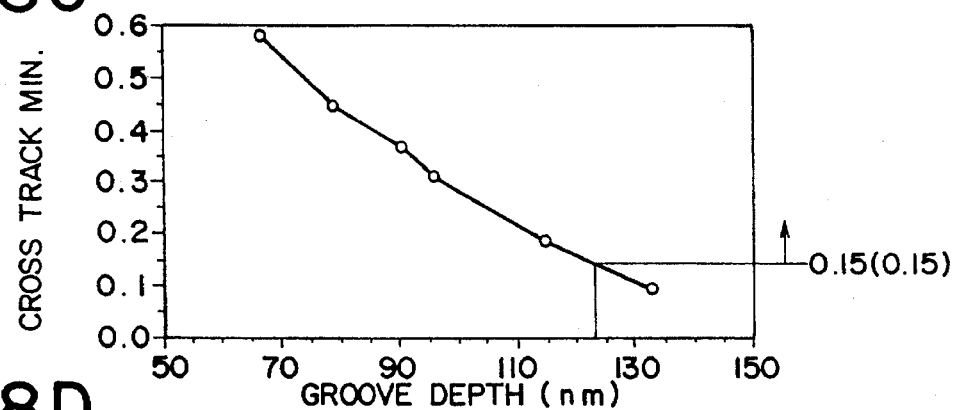
Figure 8D:
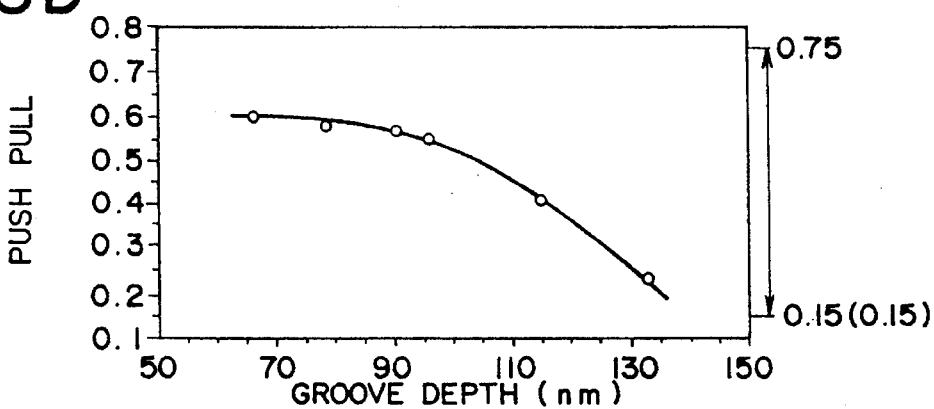

FIGS. 8B, 8C and 8D show groove depth dependences of signal characteristics obtained by a parallel polarization beam from envelope cross-track signal, envelope cross-track minimum signal and envelope push-pull signal, respectively, and normalized by a reflectance of the virtual mirror surface.

FIGS. 8B, 8C and 8D verify that groove depth ranging from 66 to 123 nm guarantees the envelope cross-track signal not lower than 0.10, the envelope cross-track minimum signal not lower than 0.15 and the envelope push-pull signal with a range from 0.15 to 0.75, which have been tabulated on Table 1, in MO area. Furthermore, the groove depth range also ensures the preferable numerical ranges of respective groove signals which have been tabulated on Table 3, namely the envelope cross-track signal not lower than 0.20, the envelope cross-track minimum signal not lower than 0.15 and the envelope push-pull signal with a range from 0.15 to 0.60.

Figure 9A:
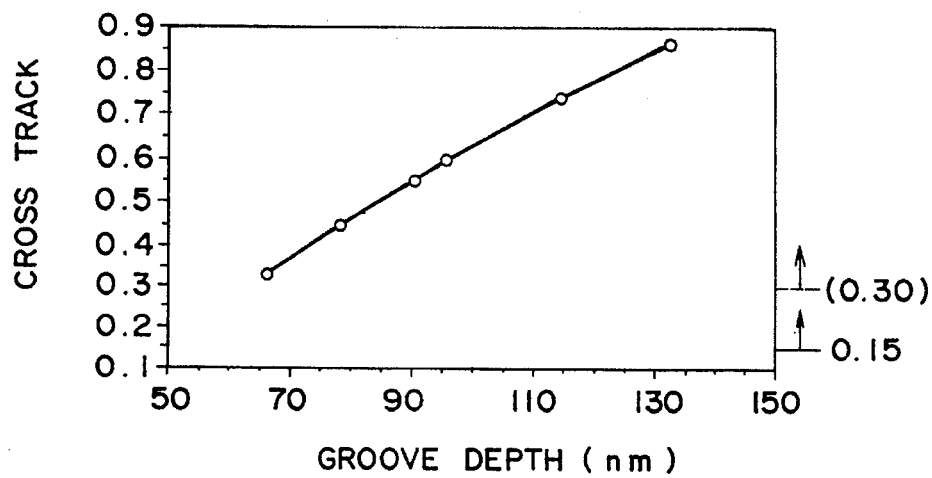
FIGS. 9A, 9B and 9C are graphs showing groove depth dependences of groove signal characteristics obtained from optical disks according to the first embodiment, measured through a parallel polarized optical beam and normalized by the reflectance of a center of a land portion.
Figure 9B:
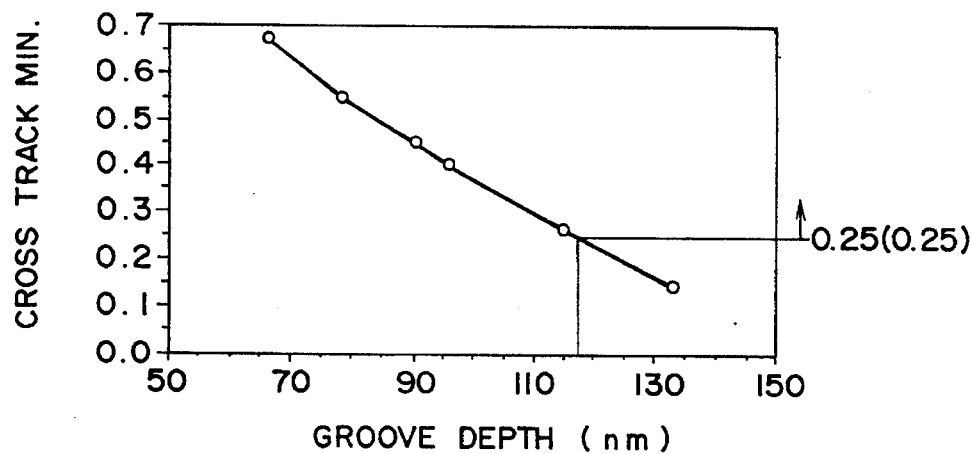
Figure 9C:
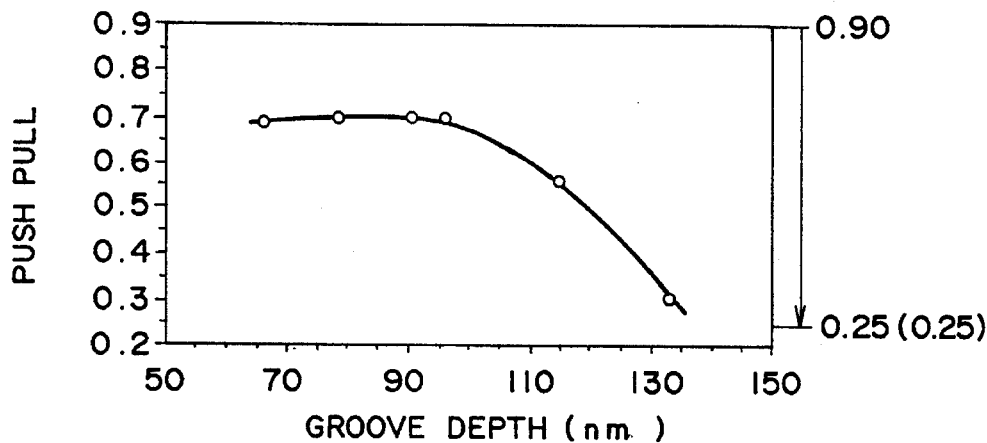

FIGS. 9A, 9B and 9C indicate groove depth dependences of envelope groove signals normalized by a reflectance of the center of a land portion obtained by employing an optical beam having a parallel polarization direction. Those figures clarify that the groove depth range from 66 to 117 nm ensures the numerical values tabulated on Table 2 for signal characteristics in MO area. At the same time, the groove depth range also guarantees the preferable numerical values tabulated on Table 4.

Figure 10A:
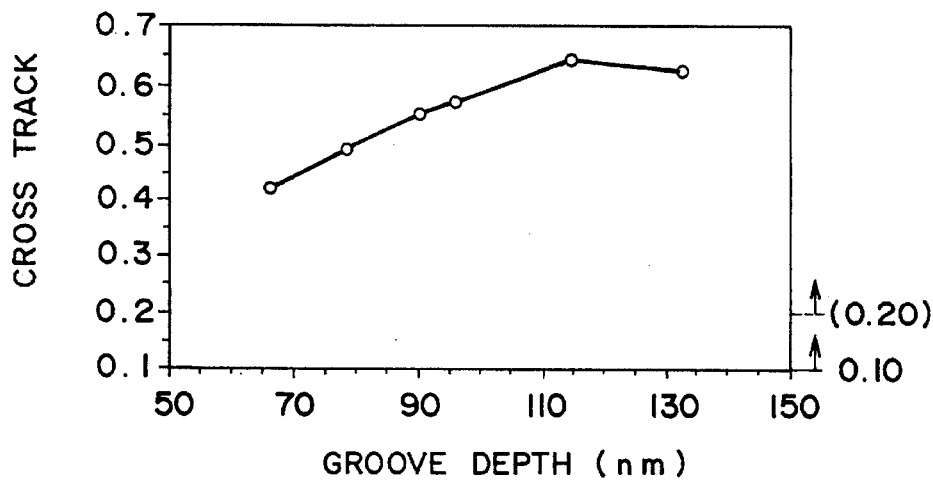
FIGS. 10A, 10B and 10C are graphs showing groove depth dependences of groove signal characteristics obtained from optical disks according to the first embodiment, measured through a perpendicularly polarized optical beam and normalized by the reflectance of a mirror surface.
Figure 10B:
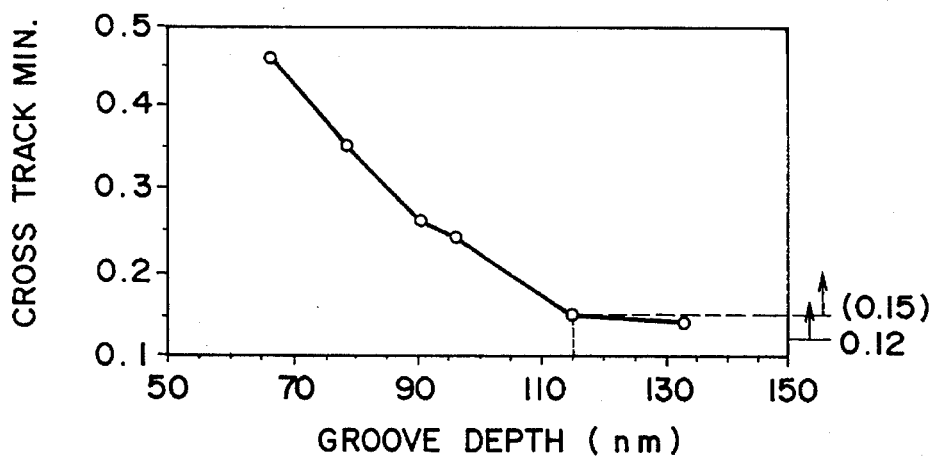
Figure 10C:
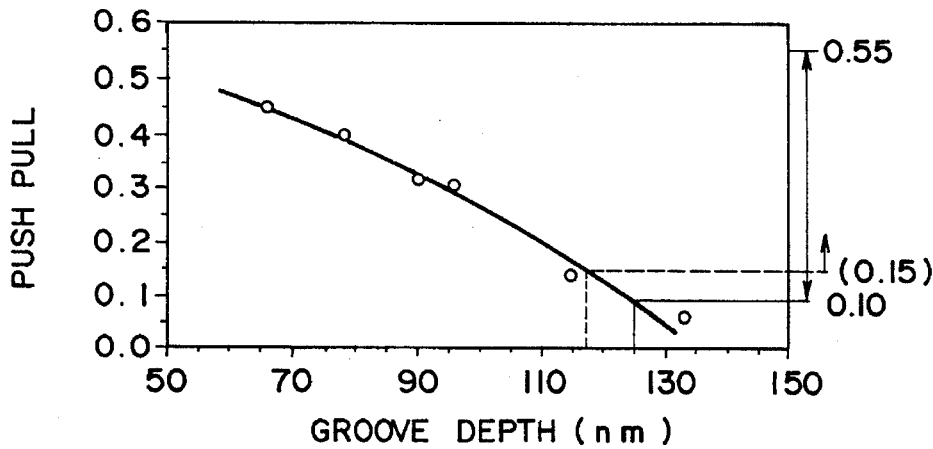

FIGS. 10A, 10B and 10C illustrate groove depth dependence of envelope groove signals normalized by a reflectance of the virtual mirror surface similarly to FIGS. 8 obtained by employing an optical beam having a perpendicular polarization direction. The figures clarify that a groove depth ranging from 66 to 125 nm can provide numerical values tabulated on Table 1. It will be understood that the preferable numerical values tabulated on Table 3 can be attained if the groove depth stays within a range from 66 to 115.

Figure 11A:
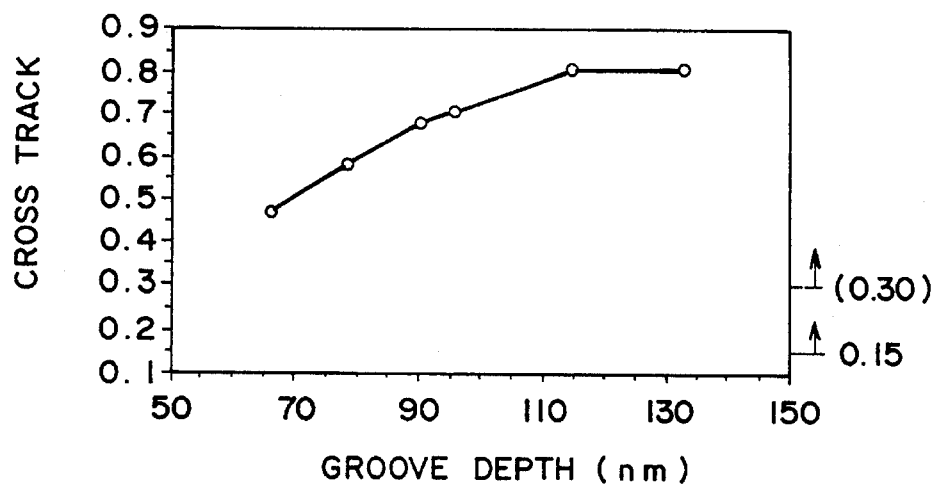
FIGS. 11A, 11B and 11C are graphs showing groove depth dependences of groove signal characteristics obtained from optical disks according to the first embodiment, measured through a perpendicularly polarized optical beam and normalized by the reflectance of a land portion.
Figure 11B:
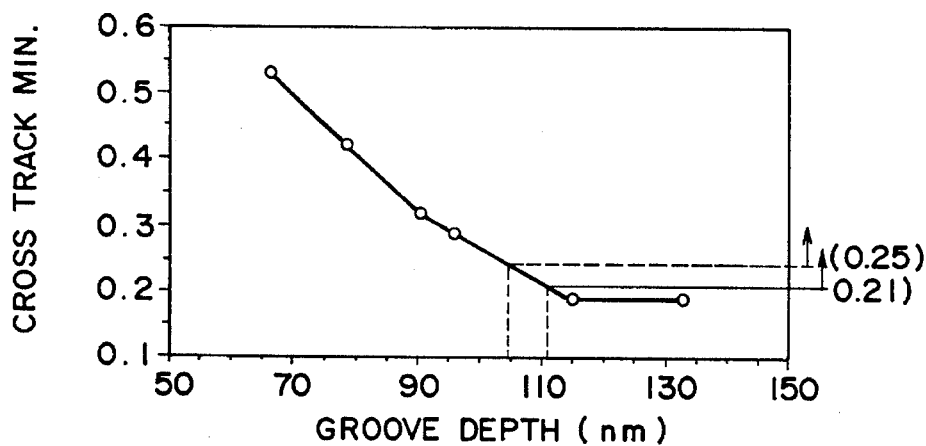
Figure 11C:
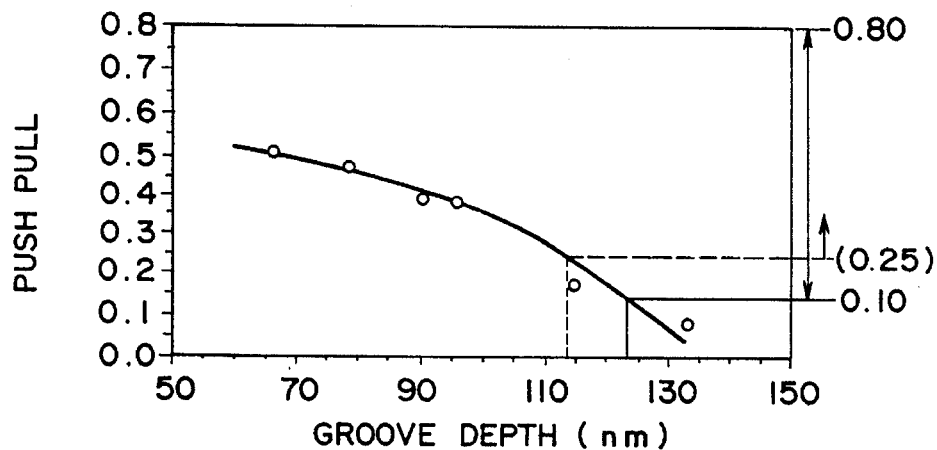

FIGS. 11A, 11B and 11C are groove depth dependences of respective signals normalized by a reflectance of the center of a land portion obtained by employing an optical beam having a perpendicular polarization direction. It is clear that the numerical values tabulated on Table 2 can be obtained if the groove depth stays within a range from 66 to 110 nm. It is also clear that the preferable numerical range tabulated on Table 4 can be obtained if the groove depth stays within a range from 66 to 103 nm.

As described above, the first embodiment according to the present invention verifies by experiments that the groove depth staying within a range from 66 to 110 nm satisfies all of the groove signal characteristics required in a MO area. An optical disk according to the first embodiment also clarified graphically that the preferable groove signal characteristics can be obtained if the groove depth stays within a range from 66 to 103 nm.

Embodiment 2

As a second embodiment of the present invention, samples of a high density magneto-optical disks were fabricated in which a laminate composed of a 75 nm-thick TaO film, a 28 nm-thick TbFeCo magneto-optical recording film, a 22 nm-thick SiN film and a 45 nm-thick aluminium alloy film was formed on a polycarbonate substrate formed with a spiral pre-groove having a track pitch of 1.15 μm. The laminate was coated by a protective film composed of an ultra-violet (UV) light hardening plastic resin film. Measurement of signal characteristics both in MO and ROM areas was performed by employing optical disk evaluation equipment using a laser of 680 nm in wavelength and a lens of 0.55 in NA (numerical aperture). Optical beams used for measurement were either parallel or perpendicularly polarized with respect to the groove direction while envelope summed and difference signals of $I_1$ and $I_2$ shown in FIGS. 4 were employed for measurement of envelope cross-track, envelope cross-track minimum, envelope push-pull and pit signals.

Each of the optical disks according to the second embodiment had annular MO regions ranging from 29.7 to 30.1 mm, from 36.0 to 42.0 mm and from 48.0 to 54.0 mm in radius and had annular ROM regions ranging from 30.1 to 36.0 mm, from 42.0 to 48.0 mm and from 54.0 to 56.0 mm in radius. Random patterns were recorded in the annular ROM regions ranging from 33.1 to 34.0 mm and from 42.0 to 43.0 mm in radius while monotonous patterns which had a minimum pit length and a minimum pit spacing were recorded in the annular ROM regions ranging from 35.0 to 36.0 mm and from 47.0 to 48 mm in radius.

Recording and modulation for the pit patterns were performed in accordance with procedures specified in ISO (International Standard Organization)/IEC (International Electrotechnical Committee) JTC (Joint Technical Committee), 1 SC (Sub-Committee) 23 WG (Working Group)-2 N-657. MCAV (Modified Constant Angular Velocity) System, wherein a number of sectors separating circumferentially a track increases with an increasing diameter, was employed for recording while PWM (Pulse Width Modulation) System was employed for modulation of the signals. In the PWM System, a front or a rear fringe of a pre-pit corresponds to, for example, a bit "1" of a bit string which is expressed in binary information "0" and "1" to be recorded on a disk. (1, 7) RLL (Run Length Limited) Algorithm was employed for code conversion. A minimum interval between pits was 1.34 μm.

Samples of optical disks according to the second embodiment were evaluated to have about 86 nm in groove depth, about 0.45 μm in groove width and about 135 nm in pit depth. The groove profiles were evaluated by an approximation procedure employing an optical diffraction while the pit depths were measured by STM (Scanning Tunneling Microscope) analysis. Pits had two species having different plane dimensions, namely Pits A and Pits B. Each of Pits A had 0.23 μm in pit width and 0.26 in ratio of pit length for a minimum long pit to minimum pit interval while each of Pits B had 0.25 μm in pit width and 0.30 in ratio of pit length for a minimum long pit to minimum pit interval, respectively. Pit width and pit length were determined by SEM (Scanning Electron Microscope) measurement. Pits A constituted bit strings for address information recorded in header or ROM areas located from 29.7 to 39.0 mm in radius while Pits B constituted bit strings recorded in header or ROM areas located from 40.0 to 51.0 mm in radius, respectively.

Pits A provided about 0.39 in minimum signal amplitude normalized by a reflectance of the center of a land portion for a parallel polarized beam and about 0.39 for a perpendicularly polarized beam while Pits B provided about 0.37 in minimum signal amplitude for a parallel polarized beam and about 0.38 for a perpendicularly polarized beam, respectively. On the other hand, Pits A provided about 0.05 in difference between a center level of maximum amplitudes and a center level of minimum amplitudes for a parallel polarized beam and 0.02 in difference for a perpendicularly polarized beam while Pits B provided 0.09 in the difference as described above for a parallel polarized beam and 0.10 in the level height difference for a perpendicularly polarized beam. It is requested by a disk drive reproducing signals output from an optical disk that a minimum amplitude of pit signals normalized by a reflectance of the center of a land portion is not lower than 0.20, and that the difference between a center level of maximum amplitudes and a center level of minimum amplitude stays within 0±0.10. The requisitions described above are satisfied by pit signals from the samples of optical disks according to the second embodiment of the present invention.

Tables 5 and 6 tabulate measured data of envelope cross-track signals, envelope cross-track minimum signals and envelope push-pull signals generated from both MO and ROM areas in the samples of optical disks according to the second embodiment. Tables 5 indicate measured data of respective envelope groove signals obtained by employing both parallel and perpendicularly polarized beams and nomalized by a reflectance of the virtual mirror surface while Tables 6 show similarly measured data normalized by a reflectance of the center of a land portion, respectively.

TABLES 5

| | | | Normalized by $(I_1 + I_2)_a$ | | |
|---|---|---|---|---|---|
| PIT | Species of Groove Signals | Magneto-Optical Recording Area | ROM Area Random Pattern | Monotonous Pattern | Variance Range |
| | | Parallel Polarized Beam | | | |
| A | CT Signal | 0.37 | 0.42 | 0.28 | — |
| | CTM Signal | 0.47 | 0.42 | 0.35 | — |
| | P-P Signal | 0.61 | 0.61 | 0.51 | 0.10 |
| B | CT Signal | 0.38 | 0.41 | 0.24 | — |
| | CTM Signal | 0.48 | 0.43 | 0.43 | — |
| | P-P Signal | 0.63 | 0.62 | 0.50 | 0.13 |
| | | Perpendicularly Polarized Beam | | | |
| A | CT Signal | 0.52 | 0.51 | 0.36 | — |
| | CTM Signal | 0.32 | 0.30 | 0.29 | — |
| | P-P Signal | 0.36 | 0.34 | 0.25 | 0.11 |
| B | CT Signal | 0.52 | 0.51 | 0.39 | — |
| | CTM Signal | 0.34 | 0.31 | 0.29 | — |
| | P-P Signal | 0.36 | 0.36 | 0.26 | 0.10 |

TABLES 6

| | | | Normalized by $(I_1 + I_2)_{OL}$ | | |
|---|---|---|---|---|---|
| PIT | Species of Groove Signals | Magneto-Optical Recording Area | ROM Area Random Pattern | Monotonous Pattern | Variance Range |
| | | Parallel Polarized Beam | | | |
| A | CT Signal | 0.45 | 0.51 | 0.35 | — |
| | CTM Signal | 0.57 | 0.51 | 0.44 | — |
| | P-P Signal | 0.74 | 0.75 | 0.64 | 0.11 |
| B | CT Signal | 0.46 | 0.49 | 0.29 | — |
| | CTM Signal | 0.57 | 0.52 | 0.51 | — |
| | P-P Signal | 0.76 | 0.74 | 0.60 | 0.16 |
| | | Perpendicularly Polarized Beam | | | |
| A | CT Signal | 0.63 | 0.62 | 0.44 | — |
| | CTM Signal | 0.39 | 0.37 | 0.36 | — |
| | P-P Signal | 0.44 | 0.41 | 0.31 | 0.13 |
| B | CT Signal | 0.62 | 0.62 | 0.47 | — |
| | CTM Signal | 0.41 | 0.37 | 0.35 | — |
| | P-P Signal | 0.44 | 0.44 | 0.31 | 0.13 |

The resultant data of Tables 5 and 6 verify that optical disks according to the second embodiment ensure not only envelope groove signals in numerical ranges required for an excellent tracking control but also in preferable numerical ranges. The data can be obtained not only from rewritable MO areas substantially without pit data but also from ROM areas having random pit data and having monotonous pit data, the monotonous pit data being thought as the severest conditions in reproducing.

Although an optical disk according to the present invention has been presented hereinabove mainly with reference to a magneto-optical disk having a MO area and a ROM area, the optical disk according to the present invention is not limited to a magneto-optical disk but includes optical disks called in general a ROM disk or a partial ROM disk having land portion and pre-groove portion as well as other optical disks of different formats.

As described above, the optical disk according to the present invention due to the groove signal characteristics as specified as above enables not only mounting on various drive units having different constructions but also a high-precision tracking control and a high-speed transfer/tracking of a head even on a high-density disk having a narrow pitch. Hence, the present invention provides a high-density optical disk commonly applicable to various types of drive units.

Although the present invention is described with reference to the preferred embodiments, the present invention is not limited to such embodiments and it will be obvious for those skilled in the art that various modifications or alterations can be easily made based on the above embodiments within the scope of the present invention.

What is claimed is:

1. An optical disk comprising data tracks and pre-grooves disposed correspondingly to said data tracks, said data tracks each having at least a planar land portion and disposed in a track-pitch not more than 1.2 µm, said data tracks and pre-grooves providing a reflected signal light to an optical detector of a disk drive, said reflected signal light containing information of groove signals including at least an envelope cross-track signal not less than 0.10, an envelope cross-track minimum signal not less than 0.12 and an envelope push-pull signal between 0.10 and 0.70 when normalized by a reflectance of a virtual mirror surface.

2. An optical disk as defined in claim 1 wherein at least one of said data tracks has data pits disposed alternately with said planar land portion.

3. An optical disk as defined in claim 1 wherein at least one of said data tracks consists of said planar land portion and address pits disposed alternately with said planar land portion.

4. An optical disk as defined in claim 3 wherein at least one of said data tracks has data pits disposed alternately with said planar land portion.

5. An optical disk as defined in claim 1 wherein said envelope cross-track signal, said envelope cross-track minimum signal, and said envelope push-pull signal are not less than 0.20, not less than 0.15 and between 0.15 and 0.60, respectively.

6. An optical disk comprising data tracks and pre-grooves disposed correspondingly to said data tracks, said data tracks each having at least a planar land portion and disposed in a track-pitch not more than 1.2 µm, said data tracks and pre-grooves providing a reflected signal light to an optical detector of a disk drive, said reflected signal light containing information of groove signals including at least an envelope cross-track signal not less than 0.10, an envelope cross-track minimum signal not less than 0.20 and an envelope push-pull signal between 0.15 and 0.80 when normalized by a reflected light from a center of one of said land portions.

7. An optical disk as defined in claim 6 wherein at least one of said data tracks has data pits disposed alternately with said planar land portion.

8. An optical disk as defined in claim 6 wherein at least one of said data tracks consists of said planar land portion and address pits disposed alternately with said planar land portion.

9. An optical disk as defined in claim 8 wherein at least one of said data tracks has data pits disposed alternately with said planar land portion.

10. An optical disk as defined in claim 6 wherein said envelope cross-track signal, said envelope cross-track minimum signal, and said envelope push-pull signal are not less than 0.30, not less than 0.25 and between 0.25 and 0.75, respectively.

* * * * *